J. LACEY & G. B. CORNELL,

Said LACEY assignor to said CORNELL.

Bush for Bung.

No. 8,759. Reissued June 17, 1879.

*Attest:*

Frederick f Goodwin

Frank H. Baker

*Inventor:*

John Lacey

George B. Cornell

By Jno. H. Whipple atty

N. PETERS, PHOTO-LITHOGRAPHER, WASHINGTON, D. C.

UNITED STATES PATENT OFFICE.

JOHN LACEY AND GEORGE B. CORNELL, OF CHICAGO, ILLINOIS; SAID LACEY ASSIGNOR TO SAID CORNELL.

IMPROVEMENT IN BUSHES FOR BUNGS.

Specification forming part of Letters Patent No. 118,617, dated August 29, 1871; Reissue No. 5,027, dated August 6, 1872; Reissue No. 8,759, dated June 17, 1879; application filed November 2, 1878.

*To all whom it may concern:*

Be it known that we, JOHN LACEY and GEORGE B. CORNELL, of Chicago, in the county of Cook and State of Illinois, have invented a new and Improved Metallic Bush for Bung-Holes of Barrels, Casks, &c.; and we do hereby declare the following specification to be such full, clear, and exact description thereof as will enable others skilled in the art to which our said invention appertains to make and use the same, reference being had to the accompanying drawings, forming part of such specification, in which—

Figure 1:
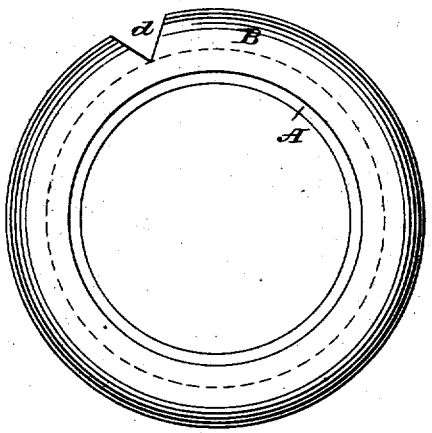
Figure 2:
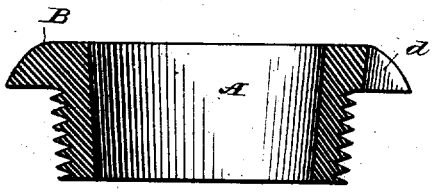

Figure 1 is a top or plan view of a bush embodying our said improvement, and Fig. 2 a vertical central section of the same.

Our invention relates to bushings for barrels; and consists of a short metallic tube in exterior form in shape of the frustum of a cone, slightly tapering. The outer surface is screw-threaded, to adapt it to be screwed forcibly into the bung-hole of the barrel, and to be held securely in place by the contact of the surfaces. The larger end of this tube is provided with an annular flange projecting outwardly, and adapted to rest, when the bushing is screwed to its place in the hole of the barrel, snugly upon the outer surface of the stave. The interior surface of the bushing is also made in the form of the frustum of a cone, and tapers uniformly from the exterior or flanged to the inner end of the bushing. This surface is made smooth and unbroken, and extends in such form quite through from one end of the bushing to the other, so that the wooden or compressible plug or bung to which it is adapted may have a ready and unobstructed entrance, and may pass, if necessary, beyond the inner end of the bushing, and have a uniform bearing-surface throughout the entire length of the bushing.

We are aware that metallic bushings have been heretofore shown having an exterior threaded surface, tapering toward the inner end of the bushing, and an interior surface, also tapering toward the inner end, said interior surface having been either cut with slots or formed at the outer end with an annular recess, or having at the interior end inwardly-projecting lips, these devices of the bush being adapted for use with metallic bungs.

Bushings so constructed we have never invented and do not desire to claim; nor do we desire to be understood as claiming a metallic bung-bush having at one end a flange, and tapering from its flanged end inwardly along both its plain interior and its screw-threaded exterior surfaces toward its smaller end, except when such interior surface is made unbroken, unobstructed, and uniformly tapering from end to end of the bush, and is thereby adapted to receive and hold a wooden or compressible bung.

Having thus described our invention, what we claim as new, and desire to secure by Letters Patent, is—

A metallic bushing for the bung-holes of barrels, made with a flange adapted to rest on the outer surface of the stave, and with an exterior threaded and an interior smooth surface, both tapering from the flanged to the inner end, said inner surface being unbroken and unobstructed, and tapering uniformly from one end of the bushing to the other, as and for the purpose set forth.

JOHN LACEY.
GEORGE B. CORNELL.

Witnesses:
MARCELLUS H. PITTS,
FLORISON D. PITTS.